United States Patent Office 3,786,057
Patented Jan. 15, 1974

3,786,057
MONOSULFATE SALT OF 3-ETHYL-6,7-DIHYDRO-2 - METHYL-5 (4',4' - ETHYLENE DIOXYPIPER-IDINOMETHYL)-INDOLE-4-(5H)-ONE
Harvey Byron Hopps, West Allis, Wis., and John Hans Biel, Lake Bluff, Ill., assignors to Aldrich Chemical Company, Inc., Milwaukee, Wis.
No Drawing. Original application Oct. 2, 1968, Ser. No. 764,594, now Patent No. 3,591,594. Divided and this application Feb. 23, 1971, Ser. No. 118,094
The portion of the term of the patent subsequent to July 6, 1988, has been disclaimed
Int. Cl. C07d 27/56
U.S. Cl. 260—293.61                  1 Claim

ABSTRACT OF THE DISCLOSURE

Compounds of the formula

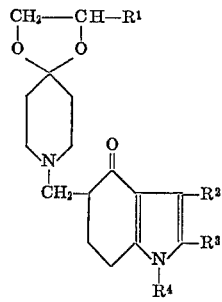

wherein $R^1$ represents a member selected from the group consisting of hydrogen, (lower)alkyl, phenyl and benzyl and $R^2$, $R^3$, and $R^4$ each represent a member selected from the group consisting of hydrogen, (lower)alkyl, (lower)alkenyl, (lower)alkynyl, phenyl and benzyl; and the pharmaceutically acceptable nontoxic salts thereof exhibit tranquilizing and antiemetic activity and are useful as tranquilizers and antiemetic agents in mammals.

CROSS-REFERENCE TO RELATED APPLICATIONS

This application is a continuation-in-part application of application Ser. No. 764,594, filed Oct. 2, 1968, now U.S. Pat. No. 3,591,594.

BACKGROUND OF THE INVENTION (1) Field of the invention.—This invention relates to novel compounds exhibiting tranquilizing and antiemetic activity which are useful as tranquilizers and antiemetic agents in mammals. In another aspect this invention relates to a method of preparing the novel compounds.

(2) Description of the prior art.—An object of the present invention is to provide novel compounds which would be of value as tranquilizing agents and antiemetic agents in mammals. While some compounds having such activity are known in the art there is a need for additional agents having tranquilizing and antiemetic activity.

Molindone [3 - ethyl - 6,7 - dihydro - 2 - methyl-5-(morpholinomethyl)-indole-4-(5H)-one] and compounds related to molindone are described by Karl Schoen, Irwin J. Pachter and Alan Rubin, 153rd National Meeting of the American Chemical Society, Miami, Fla., April 1967, p. 46M, and in U.S. Pat. No. 3,491,093 and Belgium Pat. No. 670,798.

Compounds useful in preparing the compounds of the present invention are described by H. Stetter and R. Lauterbach, Ann. 655, 20 (1962), K. E. Schulte, J. Reisch and H. Lang, Chem. Ber. 96, 1470 (1963) and S. Hauptmann, H. Blume, G. Hartmann, D. Haendel and P. Franke, Zeitschrift für Chemie, 6, 107 (1966).

SUMMARY OF THE INVENTION

There is provided according to the present invention compounds represented by the following structural formula (I)
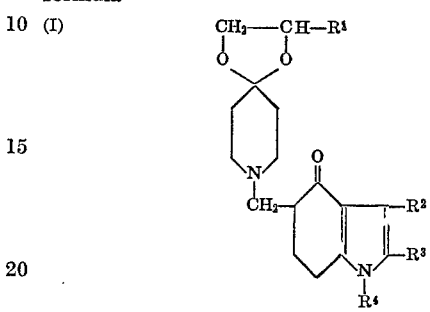

wherein $R^1$ represents a member selected form the group consisting of hydrogen, (lower)alkyl, phenyl and benzyl and $R^2$, $R^3$ and $R^4$ each represent a member selected from the group consisting of hydrogen, (lower)alkyl, (lower)alkenyl, (lower)alkynyl, phenyl and benzyl; and the pharmaceutically acceptable nontoxic salts thereof.

The pharmaceutically acceptable nontoxic salts include the organic and inorganic acid addition salts, e.g., those prepared from acids such as hydrochloric, sulfuric, sulfonic, tartaric, fumaric, hydrobromic, hydriodic, glycolic citric, maleic, phosphoric, succinic, acetic and the like. Such salts are prepared by conventional methods by reacting the free base with the desired acid on about an equimolar basis.

The term "(lower)alkyl" as used herein means both straight and branched chain alkyl radicals containing from 1 to 8 carbon atoms, e.g., methyl, ethyl, propyl, isopropyl, butyl, isobutyl, t-butyl, amyl, hexyl, 2-ethylhexyl, etc.

The term "(lower)alkenyl" as used herein means both straight and branched chain alkenyl radicals containing from 2 to 8 carbon atoms, e.g., ethenyl, allyl, 1-propenyl, 1-butenyl, 3-butenyl, 2-methyl-1-propenyl, 3-pentyl, 1-hexenyl, 7-octenyl, etc.

The term "(lower) alkynyl" as used herein means both straight and branched chain alkynyl radicals containing from 2 to 8 carbon atoms, e.g., ethinyl, propargyl, 1-butinyl, 2-butinyl, 1,1-dimethylpropargyl, 1-pentinyl, 1-heptinyl, etc.

A preferred embodiment of the present invention consists of the compounds of the formula (II)
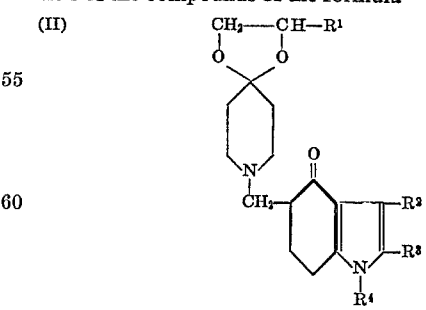

wherein $R^1$, $R^2$, $R^3$ and $R^4$ each represent hydrogen or (lower)alkyl.

A still more preferred embodiment of the present invention consists of the compounds of the formula (III)

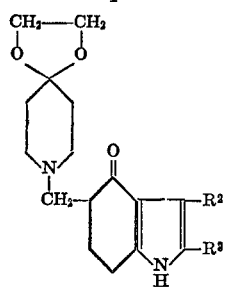

wherein $R^2$ and $R^3$ are each hydrogen or (lower)alkyl and preferably (lower)alkyl.

The compounds of this invention may be prepared for example via a Mannich reaction as described in Belgium Pat. No. 670,798 by reacting a 4,4-ethylenedioxypiperidine of the formula (IV)

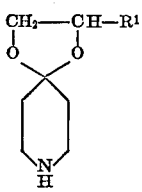

wherein $R^1$ is as previously defined or an acid addition salt thereof, e.g. hydrochloride with about an equimolar amount of 6,7-dihydroindole-4-(5H) one of the formula (V)

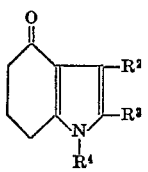

wherein $R^2$, $R^3$ and $R^4$ are as previously defined, and with about an equimolar amount of formaldehyde. Preferably the reaction is carried out in a hydroxylic solvent, e.g. methanol, ethanol and the like or in a mild acid, e.g. acetic acid and the like.

Alternatively as exemplified below the compounds of this invention may be prepared by reacting a 4,4-ethylenedioxypiperidine of Formula IV with about an equimolar amount of a 5-methylene-6,7-dihydroindole-4-(5H)-one of the formula (VI)

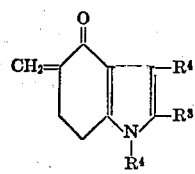

wherein $R^2$, $R^3$ and $R^4$ are as previously defined, in the presence of base, e.g. potassium hydroxide, sodium hydroxide and the like and in the presence of an alcoholic solvent such as isopropanol, ethanol and the like. Preferably the reaction is carried out at a temperature of from about 0 to 100° C. and most preferably at about ambient temperature.

The ethylenedioxypiperidines of Formula IV used as starting materials are produced according to the method of Stach et al., Monatshefte der Chemie, 93, 1090 (1962); Chem. Abstr. 59, 8750 g., by reacting a piperidone hydrochloride with the appropriate ethyleneglycol and removing the water formed azeotropically with benzene.

The 5-methylene-6,7-dihydroindole-4-(5H)-ones of Formula VI are formed from the 6,7-dihydroindole-4-(5H)-ones [the preparation thereof is described by H. Stetter and Lauterbach, Ann. 655, 20 (1962); K. E. Schulte, I. Reisch, and H. Lang, Chem. Ber. 96, 1470 (1963); S. Hauptmann, H. Blume, G. Hartmann, D. Haendel and D. Franke, Zeitschrift für Chemie, 6, 107 (1966)] via the following reaction sequence which is exemplified below:

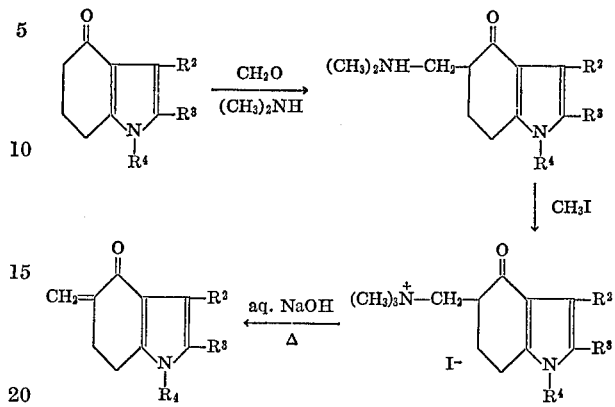

wherein $R^2$, $R^3$ and $R^4$ are as previously defined.

The compounds of Formula V are prepared according to the procedure described in Belgium Pat. No. 670,798.

The compounds of this invention possess tranquilizing activity and antiemetic activity making them useful as tranquilizers and antiemetics in mammals.

The tranquilizing activity of the compounds of this invention was evaluated by the standard condition response test. When for example 3-ethyl-6,7-dihydro-2-methyl-5-(4',4'-ethylenedioxypiperidinomethyl) - indole-4-(5H)-one was administered to the rat p.o. the avoidance $ED_{50}$ was 1 mg./kg. and the escape $ED_{50}$ was 25 mg./kg.

The antiemetic activity of the compounds of this invention was evaluated by the standard antiapomorphine test. In the test, dogs are administered the test compound p.o. 60 minutes prior to intravenous administration of a dosage of 50 mg./kg. of apomorphine. Failure of the dog to vomit is a positive response. When for example 3-ethyl-6,7-dihydro-2-methyl-5 - (4',4' - ethylenedioxypiperidinomethyl)-indole-4-(5H)-one was tested it exhibited an MED of 0.1 mg./kg. in the dog.

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. Some examples of the carriers which can be used are gelatin capsules, sugars, cellulose derivatives such as carboxymethylcellulose, gelatin, talc, magnesium, stearate, vegetable oil such as peanut oil, etc., liquid petroleum, glycerin, sorbitol, ethanol, agar, elixirs, syrups and water including sterile water. The composition may take the form of tablets, powders, granules, capsules, suspensions, solutions, and the like.

The compounds of this invention when administered orally or parenterally in a tranquilizing or antiemetic amount are effective in tranquilizing mammals and inhibiting vomiting in mammals. An oral dosage range of about 0.4 to about 5 milligrams per kilogram per day is convenient for tranquilizing mammals and a range of about 0.1 to about 5 milligrams per kilogram per day is convenient for inhibiting vomiting in mammals, which may be administered in divided dosage, e.g., two, three or four times a day. In man an oral dosage range of about 10 to about 200 milligrams per day for tranquilizing and about 5 to about 200 milligrams per day for inhibiting vomiting is convenient. For further information with respect to the administration of the compounds of this invention to man G. M. Simpson and L. Krakov, Curr. Therap. Res., 10, 41 (1968) and A. A. Sugerman and J. Herrman, Clin. Pharmacol., Therap., 8, 261 (1967) can be consulted which are related to the administration to man of molindone a related compound.

Administration of the compounds is conveniently begun at the minimal effective dose (MED) or ED$_{50}$ of the particular compound in the particular species of mammal. However, in general, the particular dosage most suitable for a particular application, as might be expected, will vary with the age, weight and general health of the mammal under treatment and the degree of tranquility of antiemetic effect required. After taking into consideration these factors and any other factors to be considered, one skilled in the art of treating diseases of mammals can readily determine the appropriate dosage.

The following examples are intended to illustrate the invention described herein without unduly restricting it.

EXAMPLE 1

Preparation of 3-ethyl-6,7-dihydro-2-methyl-5-dimethylaminomethyl-indole-4-(5H)-one hydrochloride

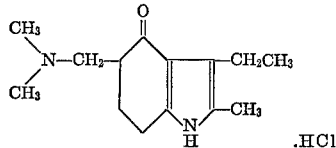

A mixture of 3 - ethyl - 6,7-dihydro-2-methylindole-4-(5H)-one [S. Hauptmann, H. Blume, G. Hartmann, D. Haendel and P. Franke, Zeitschrift für Chemie, 6, 107 (1966)] (19.43 g., 0.11 mol.), paraformaldehyde (4.95 g., 0.165 mol.), dimethylamine hydrochloride (13.53 g., 0.165 mol.) and ethanol (225 ml.) was heated at reflux temperature with stirring for 24 hours. Paraformaldehyde (1.65 g., 0.055 mol.) was added and the heating continued. Refluxing was continued for an additional 24 hours. The reaction mixture was concentrated to one-half of its original volume and after cooling, the precipitate was removed by filtration. The solid isolated weighed 15.3 g. and melted at 184–186° C. From the mother liquor three subsequent crops were obtained and recrystallized from ethanol. The first solid crop was also recrystallized from ethanol. A total of 14.46 g. (48% yield) of solid was obtained by combining the recrystallized fractions. The melting point is 183–187° C.

EXAMPLE 2

Preparation of 3-ethyl-6,7-dihydro-2-methyl-5-dimethylaminomethyl-indole-4-(5H)-one methiodide

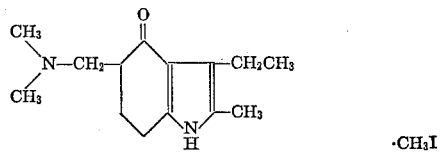

An aqueous solution of 3-ethyl-6,7-dihydro-2-methyl-5 - dimethyl - aminomethyl-indole-4-(5H)-one hydrochloride (14.46 g., 0.053 mol.) and water (60 ml.) was treated with one equivalent of aqueous sodium hydroxide. The resulting mixture was extracted with ether. The ethereal extract was dried over anhydrous potassium carbonate then added dropwise to methyl iodine (22.7 g., 0.16 mol.) dissolved in ether (50 ml.). The mixture was stirred for two days, the solid collected and dried, yield 17.7 g. (86% yield); M.P. 218–219° C.

EXAMPLE 3

Preparation of 3-ethyl-6,7-dihydro-2-methyl-5-methylene-indole-4-(5H)-one

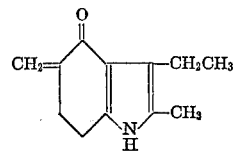

A cool solution of sodium hydroxide (0.2 g., 0.005 mol.) in water (20 ml.) was added dropwise to a solution of 3-ethyl-6,7-dihydro-2-methyl-5-(dimethylaminomethyl)-indole-4-(5H)-one methiodide (1.83 g., 0.00487 mol.) in water (135 ml.). The reaction mixture was stirred for 3 hours at 20° C. The solid that precipitated was collected and air dried; it weighed 1.55 g.; a dry sample melted at 208–210° C.

EXAMPLE 4

Preparation of 3-ethyl 6,7-dihydro-2-methyl-5-(4',4'-ethylenedioxypiperidinomethyl)-indole-4-(5H)-one

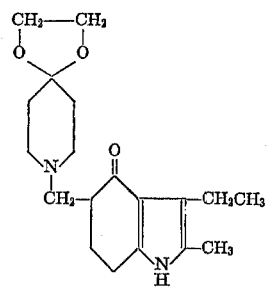

To a solution of 3-ethyl-6,7-dihydro-2-methyl-5-methyleneindole-4-(5H)-one (1.89 g., 0.01 mol.) in methanol (150 ml.) was added potassium hydroxide (one pellet) and 4,4-ethylenedioxypiperidine (1.43 g., 0.01 mol.). The mixture was swirled and allowed to stand for seven days. It was then evaporated. The residue was dissolved in refluxing isopropanol and permitted to stand. A first solid crop was collected; it weighed 2.3 g., M.P. 182–183° C. A sample of the product, 3-ethyl-6,7-dihydro-2-methyl - 5 - (4',4'-ethylenedioxypiperidinomethyl)-indole-4-(5H)-one, recrystallized from isopropanol for analysis melted at 184–185° C.

*Analysis.*—Calc'd for $C_{19}H_{28}N_2O_3$ (percent): C, 68.64; H, 8.49; N, 8.43. Found (percent): C, 68.88; H, 8.27; N, 8.49.

EXAMPLE 5

Preparation of 3 - ethyl - 6,7 - dihydro - 2-methyl-5-(4',4'-ethylenedioxypiperidinomethyl)-indole-4-(5H)-one hydrochloride A solution of 3-ethyl-6,7-dihydro-2-methyl-5-(4',4'-ethylenedioxypiperidinomethyl) - indole-4-(5H)-one (3.3 g.) and anhydrous tetrahydrofuran was treated with anhydrous hydrogen chloride until the colorless solution became yellow. A solid precipitated. This was collected and dried at 60° C. for two hours in the vacuum oven. The salt weighed 3 g. It melted at 141–142° C. with evolution of a gas.

*Analysis.*—Calc'd for $C_{19}H_{29}ClN_2O_3$ (percent): C, 61.68; H, 7.92; N, 7.59; Cl, 9.61. Found (percent): C, 62.27; H, 7.93; N, 6.79; Cl, 8.73.

EXAMPLE 6

Preparation of 3-ethyl - 6,7 - dihydro-2-methyl-5-(4',4'-ethylenedioxypiperidinomethyl) - indole - 4 - (5H)-one sesquifumarate To a solution of 3-ethyl-6,7-dihydro-2-methyl-4-(4',4'-ethylenedioxypiperidinomethyl)-indole-4-(5H) - one (3.3 g.) and refluxing isopropanol (15 ml.) was added a solution of fumaric acid (1.16 g.) dissolved in refluxing isopropanol (15 ml.). The resulting solution was cooled to room temperature then refrigerated. The solid which separated was collected. It weighed 2.5 g. and melted at 153.5–156° C. The solid was recrystallized from isopropanol (40 ml.) which yielded 1.9 g. solid salt melting at 152–154° C. A sample prepared in the same manner gave M.P. 156.5–157.5° C.

*Analysis.*—Calc'd for $C_{25}H_{34}N_2O_9$ (percent): C, 59.27; H, 6.76; N, 5.54. Found (percent): C, 59.24; H, 7.03; N, 5.48.

EXAMPLE 7

When in the procedure of Example 4, 4,4-ethylenedioxypiperidine is replaced by an equal molar amount of 4,4-(methylethylenedioxy)piperidine,
4,4-(ethylethylenedioxy)piperidine,
4,4-(phenylethylenedioxy)piperidine,
4,4-(benzylethylenedioxypiperidine,
4,4-(propylethylenedioxy)piperidine,
4,4-(isopropylethylenedioxy)piperidine,
4,4-(hexylethylenedioxy)piperidine,
4,4-(isobutylethylenedioxy)piperidine,
4,4-(butylethylenedioxy)piperidine, and
4,4-(t-butylethylenedioxy)piperidine, there are obtained 3-ethyl-6,7-dihydro-2-methyl-5-[4',4'-(methylethylenedioxy)piperidinomethyl]-indole-4-(5H)-one,
3-ethyl-6,7-dihydro-2-methyl-5-[4',4'-(ethylethylenedioxy)piperidinomethyl]-indole-4-(5H)-one,
3-ethyl-6,7-dihydro-2-methyl-5-[4',4'-(phenylethylenedioxy)piperidinomethyl]-indole-5-(5H)-one,
3-ethyl-6,7-dihydro-2-methyl-5-[4',4'-(benzylethylenedioxy)piperidinomethyl]-indole-4-(5H)-one,
3-ethyl-6,7-dihydro-2-methyl-5-[4',4'-(propylethylenedioxy)piperidinomethyl]-indole-4-(5H)-one,
3-ethyl-6,7-dihydro-2-methyl-5-[4',4'-(isopropylethylenedioxy)piperidinomethyl]-indole-4-(5H)-one,
3-ethyl-6,7-dihydro-2-methyl-5-[4',4'-(hexylethylenedioxy)piperidinomethyl]-indole-4-(5H)-one,
3-ethyl-6,7-dihydro-2-methyl-5-[4',4'-(isobutylethylenedioxy)piperidinomethyl]-indole-4-(5H)-one,
3-ethyl-6,7-dihydro-2-methyl-5-[4',4'-(butylethylenedioxy)piperidinomethyl]-indole-4-(5H)-one, and
3-ethyl-6,7-dihydro-2-methyl-5-[4',4'-(t-butylethylenedioxy)piperidinomethyl]-indole-4-(5H)-one, respectively.

EXAMPLE 8

When in the procedure of Example 1, 3-ethyl-6,7-dihydro-2-methylindole-4-(5H)-one is replaced by an equal molar amount of 6,7-dihydroindole-4-(5H)-one,
3-ethyl-6,7-dihydro-1,2-dimethylindole-4-(5H)-one,
6,7-dihydro-2,3-dimethylindole-4-(5H)-one,
2,3-diethyl-6,7-dihydroindole-4-(5H)-one,
3-ethyl-6,7-dihydroindole-4-(5H)-one,
6,7-dihydro-2-methylindole-4-(5H)-one,
3-ethyl-6,7-dihydro-2-propylindole-4-(5H)-one,
3-ethyl-6,7-dihydro-2-benzylindole-4-(5H)-one,
3-ethyl-6,7-dihydro-2-phenylindole-4-(5H)-one,
3-ethyl-6,7-dihydro-2-vinylindole-4-(5H)-one,
3-ethyl-6,7-dihydro-2-ethinylindole-4-(5H)-one,
3-ethyl-6,7-dihydro-2-isopropylindole-4-(5H)-one,
3-ethyl-6,7-dihydro-2-butylindole-4-(5H)-one,
3-ethyl-6,7-dihydro-2-allylindole-4-(5H)-one,
3-ethyl-6,7-dihydro-2-propargylindole-4-(5H)-one,
3-ethyl-6,7-dihydro-2-ethinylindole-4-(5H)-one,
3-propyl-6,7-dihydro-2-methylindole-4-(5H)-one,
3-benzyl-6,7-dihydro-2-methylindole-4-(5H)-one,
3-phenyl-6,7-dihydro-2-methylindole-4-(5H)-one,
3-vinyl-6,7-dihydro-2-methylindole-4-(5H)-one,
3-ethinyl-6,7-dihydro-2-methylindole-4-(5H)-one,
3-isopropyl-6,7-dihydro-2-methylindole-4-(5H)-one,
3-butyl-6,7-dihydro-2-methylindole-4-(5H)-one,
3-allyl-6,7-dihydro-2-methylindole-4-(5H)-one,
3-propargyl-6,7-dihydro-2-methylindole-4-(5H)-one,
3-ethinyl-6,7-dihydro-2-methylindole-4-(5H)-one,
1,3-diethyl-6,7-dihydro-2-methylindole-4-(5H)-one,
1-propyl-3-ethyl-6,7-dihydro-2-methylindole-4-(5H)-one,
1-benzyl-3-ethyl-6,7-dihydro-2-methylindole-4-(5H)-one,
1-phenyl-2-ethyl-6,7-dihydro-2-methylindole-4-(5H)-one,
1-vinyl-3-ethyl-6,7-dihydro-2-methylindole-4-(5H)-one,
1-ethinyl-3-ethyl-6,7-dihydro-2-methylindole-4-(5H)-one,
1-isopropyl-3-ethyl-6,7-dihydro-2-methylindole-4-(5H)-one,
1-butyl-3-ethyl-6,7-dihydro-2-methylindole-4-(5H)-one,
1-allyl-3-ethyl-6,7-dihydro-2-methylindole-4-(5H)-one,
1-propargyl-3-ethyl-6,7-dihydro-2-methylindole-4-(5H)-one,
1-ethinyl-3-ethyl-6,7-dihydro-2-methylindole-4-(5H)-one,
1,2,3-trimethyl-6,7-dihydroindole-4-(5H)-one,
1,2,3-triphenyl-6,7-dihydroindole-4-(5H)-one,
1,2,3-tribenzyl-6,7-dihydroindole-4-(5H)-one, and
1,2,3-triethyl-6,7-dihydroindole-4-(5H)-one, there are obtained 6,7-dihydro-5-dimethylaminomethyl-indole-4-(5H)-one hydrochloride,
3-ethyl-6,7-dihydro-1,2-dimethyl-5-dimethylaminomethyl-indole-4-(5H)-one hydrochloride,
6,7-dihydro-2,3-dimethyl-5-dimethylaminomethyl-indole-4-(5H)-one hydrochloride,
2,3-diethyl-6,7-dihydro-5-dimethylaminomethyl-indole-4-(5H)-one hydrochloride,
3-ethyl-6,7-dihydro-5-dimethylaminomethyl-indole-4-(5H)-one hydrochloride,
6,7-dihydro-2-methyl-5-dimethylaminomethyl-indole-4-(5H)-one hydrochloride,
3-ethyl-6,7-dihydro-2-propyl-5-dimethylaminomethyl-indole-4-(5H)-one hydrochloride,
3-ethyl-6,7-dihydro-2-benzyl-5-dimethylaminomethyl-indole-4-(5H)-one hydrochloride,
3-ethyl-6,7-dihydro-2-phenyl-5-dimethylaminomethyl-indole-4-(5H)-one hydrochloride,
3-ethyl-6,7-dihydro-2-vinyl-5-dimethylaminomethyl-indole-4-(5H)-one hydrochloride,
3-ethyl-6,7-dihydro-2-ethinyl-5-dimethylaminomethyl-indole-4-(5H)-one hydrochloride,
3-ethyl-6,7-dihydro-2-isopropyl-5-dimethylaminomethyl-indole-4-(5H)-one hydrochloride,
3-ethyl-6,7-dihydro-2-butyl-5-dimethylaminomethyl-indole-4-(5H)-one hydrochloride,
3-ethyl-6,7-dihydro-2-allyl-5-dimethylaminomethyl-indole-4-(5H)-one hydrochloride,
3-ethyl-6,7-dihydro-2-propargyl-5-dimethylaminomethyl-indole-4-(5H)-one hydrochloride,
3-ethyl-6,7-dihydro-2-ethinyl-5-dimethylaminomethyl-indole-4-(5H)-one hydrochloride,
3-propyl-6,7-dihydro-2-methyl-5-dimethylaminomethyl-indole-4-(5H)-one hydrochloride,
3-benzyl-6,7-dihydro-2-methyl-5-dimethylaminomethyl-indole-4-(5H)-one hydrochloride,
3-phenyl-6,7-dihydro-2-methyl-5-dimethylaminomethyl-indole-4-(5H)-one hydrochloride,
3-vinyl-6,7-dihydro-2-methyl-5-dimethylaminomethyl-indole-4-(5H)-one hydrochloride,
3-ethinyl-6,7-dihydro-2-methyl-5-dimethylaminomethyl-indole-4-(5H)-one hydrochloride,
3-isopropyl-6,7-dihydro-2-methyl-5-dimethylaminomethyl-indole-4-(5H)-one hydrochloride,
3-butyl-6,7-dihydro-2-methyl-5-dimethylaminomethyl-indole-4-(5H)-one hydrochloride,
3-allyl-6,7-dihydro-2-methyl-5-dimethylaminomethyl-indole-4-(5H)-one hydrochloride,
3-propargyl-6,7-dihydro-2-methyl-5-dimethylaminomethyl-indole-4-(5H)-one hydrochloride,
3-ethinyl-6,7-dihydro-2-methyl-5-dimethylaminomethyl-indole-4-(5H)-one hydrochloride,
1,3-diethyl-6,7-dihydro-2-methyl-5-dimethylaminomethyl-indole-4-(5H)-one hydrochloride,
1-propyl-3-ethyl-6,7-dihydro-2-methyl-5-dimethylaminomethyl-indole-4-(5H)-one hydrochloride,
1-benzyl-3-ethyl-6,7-dihydro-2-methyl-5-dimethylaminomethyl-indole-4-(5H)-one hydrochloride,
1-phenyl-3-ethyl-6,7-dihydro-2-methyl-5-dimethylaminomethyl-indole-4-(5H)-one hydrochloride,
1-vinyl-3-ethyl-6,7-dihydro-2-methyl-5-dimethylaminomethyl-indole-4-(5H)-one hydrochloride, 1-ethinyl-3-ethyl-6,7-dihydro-2-methyl-5-dimethyl-
   aminomethyl-indole-4-(5H)-one hydrochloride,
1-isopropyl-3-ethyl-6,7-dihydro-2-methyl-5-dimethyl-
   aminomethyl-indole-4-(5H)-one hydrochloride,
1-butyl-3-ethyl-6,7-dihydro-2-methyl-5-dimethylamino-
   methyl-indole-4-(5H)-one hydrochloride,
1-allyl-3-ethyl-6,7-dihydro-2-methyl-5-dimethylamino-
   methyl-indole-4-(5H)-one hydrochloride,
1-propargyl-3-ethyl-6,7-dihydro-2-methyl-5-dimethyl-
   aminomethyl-indole-4-(5H)-one hydrochloride,
1-ethinyl-3-ethyl-6,7-dihydro-2-methyl-5-dimethylamino-
   methyl-indole-4-(5H)-one hydrochloride,
1,2,3-trimethyl-6,7-dihydro-5-dimethylaminomethyl-
   indole-4-(5H)-one hydrochloride,
1,2,3-triphenyl-6,7-dihydro-5-dimethylaminomethyl-
   indole-4-(5H)-one hydrochloride,
1,2,3-tribenzyl-6,7-dihydro-5-dimethylaminomethyl-
   indole-4-(5)-one hydrochloride, and
1,2,3-triethyl-6,7-dihydro-5-dimethylaminomethyl-indole-
   4-(5H)-one hydrochloride, respectively.

EXAMPLE 9

When in the procedure of Example 2, 3-ethyl-6,7-dihydro-2-methyl-5-dimethylaminomethyl-indole-4 - (5H)-one is replaced by an equal molar amount of each of the products of Example 8, there are obtained.

6,7-dihydro-5-dimethylaminomethyl-indole-4-(5H)-one
   methiodide,
3-ethyl-6,7-dihydro-1,2-dimethyl-5-dimethylaminomethyl-
   indole-4-(5H)-one methiodide,
6,7-dihydro-2,3-dimethyl-5-dimethylaminomethyl-indole-
   4-(5H)-one methiodide,
2,3-diethyl-6,7-dihydro-5-dimethylaminomethyl-indole-
   4-(5H)-one methiodide,
3-ethyl-6,7-dihydro-5-dimethylaminomethyl-indole-4-
   (5H)-one methiodide,
6,7-dihydro-2-methyl-5-dimethylaminomethyl-indole-4-
   (5H)-one methiodide,
3-ethyl-6,7-dihydro-2-propyl-5-dimethylaminomethyl-
   indole-4-(5H)-one methiodide,
3-ethyl-6,7-dihydro-2-benzyl-5-dimethylaminomethyl-
   indole-4-(5H)-one methiodide,
3-ethyl-6,7-dihydro-2-phenyl-5-dimethylaminomethyl-
   indole-4-(5H)-one methiodide,
3-ethyl-6,7-dihydro-2-vinyl-5-dimethylaminomethyl-
   indole-4-(5H)-one methiodide,
3-ethyl-6,7-dihydro-2-ethinyl-5-dimethylaminomethyl-
   indole-4-(5H)-one methiodide,
3-ethyl-6,7-dihydro-2-isopropyl-5-dimethylaminomethyl-
   indole 4-(5H)-one methiodide,
3-ethyl-6,7-dihydro-2-butyl-5-dimethylaminomethyl-
   indole-4-(5H)-one methiodide,
3-ethyl-6,7-dihydro-2-allyl-5-dimethylaminomethyl-
   indole-4-(5H)-one methiodide,
3-ethyl-6,7-dihydro-2-propargyl-5-dimethylaminomethyl-
   indole-4-(5H)-one methiodide,
3-ethyl-6,7-dihydro-2-ethinyl-5-dimethylaminomethyl-
   indole-4-(5H)-one methiodide,
3-propyl-6,7-dihydro-2-methyl-5-dimethylaminomethyl-
   indole-4-(5H)-one methiodide,
3-benzyl-6,7-dihydro-2-methyl-5-dimethylaminomethyl-
   indole-4-(5H)-one methiodide,
3-phenyl-6,7-dihydro-2-methyl-5-dimethylaminomethyl-
   indole-4-(5H)-one methiodide,
3-vinyl-6,7-dihydro-2-methyl-5-dimethylaminomethyl-
   indole-4-(5H)-one methiodide,
3-ethinyl-6,7-dihydro-2-methyl-5-dimethylaminomethyl-
   indole-4-(5H)-one methiodide,
3-isopropyl-6,7-dihydro-2-methyl-5-dimethylamino-
   methyl-indole-4-(5H)-one methiodide,
3-butyl-6,7-dihydro-2-methyl-5-dimethylaminomethyl-
   indole-4-(5H)-one methiodide,
3-allyl-6,7-dihydro-2-methyl-5-dimethylaminomethyl-
   indole-4-(5H)-one methiodide,
3-propargyl-6,7-dihydro-2-methyl-5-dimethylamino-
   methyl-indole-4-(5H)-one methiodide,
3-ethinyl-6,7-dihydro-2-methyl-5-dimethylaminomethyl-
   indole-4-(5H)-one methiodide,
1,3-diethyl-6,7-dihydro-2-methyl-5-dimethylaminomethyl-
   indole-4-(5H)-one methiodide,
1-propyl-3-ethyl-6,7-dihydro-2-methyl-5-dimethylamino-
   methyl-indole-4-(5H)-one methiodide,
1-benzyl-3-ethyl-6,7-dihydro-2-methyl-5-dimethylamino-
   methyl-indole-4-(5H)-one methiodide,
1-phenyl-3-ethyl-6,7-dihydro-2-methyl-5-dimethylamino-
   methyl-indole-4-(5H)-one methiodide,
1-vinyl-3-ethyl-6,7-dihydro-2-methyl-5-dimethylamino-
   methyl-indole-4-(5H)-one methiodide,
1-ethinyl-3-ethyl-6,7-dihydro-2-methyl-5-dimethylamino-
   methyl-indole-4-(5H)-one methiodide,
1-isopropyl-3-ethyl-6,7-dihydro-2-methyl-5-dimethyl-
   aminomethyl-indole-4-(5H)-one methiodide,
1-butyl-3-ethyl-6,7-dihydro-2-methyl-5-dimethylamino-
   methyl-indole-4-(5H)-one methiodide,
1-allyl-3-ethyl-6,7-dihydro-2-methyl-5-dimethylamino-
   methyl-indole-4-(5H)-one methiodide,
1-propargyl-3-ethyl-6,7-dihydro-2-methyl-5-dimethyl-
   aminomethyl-indole-4-(5H)-one methiodide,
1-ethinyl-3-ethyl-6,7-dihydro-2-methyl-5-dimethylamino-
   methyl-indole-4-(5H)-one methiodide,
1,2,3-trimethyl-6,7-dihydro-5-dimethylaminomethyl-
   indole-4-(5H)-one methiodide,
1,2,3-triphenyl-6,7-dihydro-5-dimethylaminomethyl-
   indole-4-(5H)-one methiodide,
1,2,3-tribenzyl-6,7-dihydro-5-dimethylaminomethyl-
   indole-4-(5H)-one methiodide, and
1,2,3-triethyl-6,7-dihydro-5-dimethylaminomethyl-indole-
   4-(5H)-one methiodide, respectively

EXAMPLE 10

When in the procedure of Example 3, 3-ethyl-6,7-dihydro - 2-methyl-5-dimethylaminomethyl-indole-4-(5H)-one methiodide is replaced by an equal molar amount of each of the products of Example 9, there are obtained 6,7-dihydro-5-methylene-indole-4-(5H)-one,
3-ethyl-6,7-dihydro-1,2-dimethyl-5-methylene-indole-4-
   (5H)-one,
6,7-dihydro-2,3-dimethyl-5-methylene-indole-4-(5H)-one,
2,3-diethyl-6,7-dihydro-5-methylene-indole-4-(5H)-one,
3-ethyl-6,7-dihydro-5-methylene-indole-4-(5H)one,
6,7-dihydro-2-methyl-5-methylene-indole-4-(5H)-one,
3-ethyl-6,7-dihydro-2-propyl-5-methylene-indole-4-(5H)-
   one,
3-ethyl-6,7-dihydro-2-benzyl-5-methylene-indole-4-(5H)-
   one,
3-ethyl-6,7-dihydro-2-phenyl-5-methylene-indole-4-(5H)-
   one,
3-ethyl-6,7-dihydro-2-vinyl-5-methylene-indole-4-(5H)-
   one,
3-ethyl-6,7-dihydro-2-ethinyl-5-methylene-indole-4-(5H)-
   one,
3-ethyl-6,7-dihydro-2-isopropyl-5-methylene-indole-4-
   (5H)-one,
3-ethyl-6,7-dihydro-2-butyl-5-methylene-indole-4-(5H)-
   one,
3-ethyl-6,7-dihydro-2-allyl-5-methylene-indole-4-(5H)-
   one,
3-ethyl-6,7-dihydro-2-propargyl-5-methylene-indole-4-
   (5H)-one,
3-ethyl-6,7-dihydro-2-ethinyl-5-methylene-indole-4-(5H)-
   one,
3-propyl-6,7-dihydro-2-methyl-5-methylene-indole-4-
   (5H)-one,
3-benzyl-6,7-dihydro-2-methyl-5-methylene-indole-4-
   (5H)-one, 3-phenyl-6,7-dihydro-2-methyl-5-methylene-indole-4-(5H)-one,
3-vinyl-6,7-dihydro-2-methyl-5-methylene-indole-4-(5H)-one,
3-ethinyl-6,7-dihydro-2-methyl-5-methylene-indole-4-(5H)-one,
3-isopropyl-6,7-dihydro-2-methyl-5-methylene-indole-4-(5H)-one,
3-butyl-6,7-dihydro-2-methyl-5-methylene-indole-4-(5H)-one,
3-allyl-6,7-dihydro-2-methyl-5-methylene-indole-4-(5H)-one,
3-propargyl-6,7-dihydro-2-methyl-5-methylene-indole-4-(5H)-one,
3-ethinyl-6,7-dihydro-2-methyl-5-methylene-indole-4-(5H)-one,
1,3-diethyl-6,7-dihydro-2-methyl-5-methylene-indole-4-(5H)-one,
1-propyl-3-ethyl-6,7-dihydro-2-methyl-5-methylene-indole-4-(5H)-one,
1-benzyl-3-ethyl-6,7-dihydro-2-methyl-5-methylene-indole-4-(5H)-one,
1-phenyl-3-ethyl-6,7-dihydro-2-methyl-5-methylene-indole-4-(5H)-one,
1-vinyl-3-ethyl-6,7-dihydro-2-methyl-5-methylene-indole-4-(5H)-one,
1-ethinyl-3-ethyl-6,7-dihydro-2-methyl-5-methylene-indole-4-(5H)-one,
1-isopropyl-3-ethyl-6,7-dihydro-2-methyl-5-methylene-indole-4-(5H)-one,
1-butyl-3-ethyl-6,7-dihydro-2-methyl-5-methylene-indole-4-(5H)-one,
1-allyl-3-ethyl-6,7-dihydro-2-methyl-5-methylene-indole-4-(5H)-one,
1-propargyl-3-ethyl-6,7-dihydro-2-methyl-5-methylene-indole-4-(5H)-one,
1-ethinyl-3-ethyl-6,7-dihydro-2-methyl-5-methylene-indole-4-(5H)-one,
1,2,3-trimethyl-6,7-dihydro-5-methylene-indole-4-(5H)-one,
1,2,3-triphenyl-6,7-dihydro-5-methylene-indole-4-(5H)-one,
1,2,3-tribenzyl-6,7-dihydro-5-methylene-indole-4-(5H)-one, and
1,2,3-triethyl-6,7-dihydro-5-methylene-indole-4-(5H)-one, respectively.

EXAMPLE 11

When in the procedure of Example 4, 3-ethyl-6,7-dihydro - 2 - methyl-5-methylene-indole-4-(5H)-one is replaced by an equal molar amount of each of the products of Example 10, there are obtained.

6,7-dihydro-5-(4',4'-ethylenedioxypiperidinomethyl)-indole-4-(5H)-one,
3-ethyl-6,7-dihydro-1,2-dimethyl-5-(4',4'-ethylenedioxypiperidinomethyl)-indole-4-(5H)-one,
6,7-dihydro-2,3-dimethyl-5-(4',4'-ethylenedioxypiperidinomethyl)-indole-4-(5H)-one,
2,3-diethyl-6,7-dihydro-5-(4',4'-ethylenedioxypiperidinomethyl)-indole-4-(5H)-one,
3-ethyl-6,7-dihydro-5-(4',4'-ethylenedioxypiperidinomethyl)-indole-4-(5H)-one,
6,7-dihydro-2-methyl-5-(4',4'-ethylenedioxypiperidinomethyl)-indole-4-(5H)-one,
3-ethyl-6,7-dihydro-2-propyl-5-(4',4'-ethylenedioxypiperidinomethyl)-indole-4-(5H)-one,
3-ethyl-6,7-dihydro-2-benzyl-5-(4',4'-ethylenedioxypiperidinomethyl)-indole-4-(5H)-one,
3-ethyl-6,7-dihydro-2-phenyl-5-(4',4'-ethylenedioxypiperidinomethyl)-indole-4-(5H)-one,
3-ethyl-6,7-dihydro-2-vinyl-5-(4',4'-ethylenedioxypiperidinomethyl)-indole-4-(5H)-one,
3-ethyl-6,7-dihydro-2-ethinyl-5-(4',4'-ethylenedioxypiperidinomethyl)-indole-4-(5H)-one,
3-ethyl-6,7-dihydro-2-isopropyl-5-(4',4'-ethylenedioxypiperidinomethyl)-indole-4-(5H)-one,
3-ethyl-6,7-dihydro-2-butyl-5-(4',4'-ethylenedioxypiperidinomethyl)-indole-4-(5H)-one,
3-ethyl-6,7-dihydro-2-allyl-5-(4',4'-ethylenedioxypiperidinomethyl)-indole-4-(5H)-one,
3-ethyl-6,7-dihydro-2-propargyl-5-(4',4'-ethylenedioxypiperidinomethyl)-indole-4-(5H)-one,
3-ethyl-6,7-dihydro-2-ethinyl-5-(4',4'-ethylenedioxypiperidinomethyl)-indole-4-(5H)-one,
3-propyl-6,7-dihydro-2-methyl-5-(4',4'-ethylenedioxypiperidinomethyl)-indole-4-(5H)-one,
3-benzyl-6,7-dihydro-2-methyl-5-(4',4'-ethylenedioxypiperidinomethyl)-indole-4-(5H)-one,
3-phenyl-6,7-dihydro-2-methyl-5-(4',4'-ethylenedioxypiperidinomethyl)-indole-4-(5H)-one,
3-vinyl-6,7-dihydro-2-methyl5-(4',4'-ethylenedioxypiperidinomethyl)-indole-4-(5H)-one,
3-ethinyl-6,7-dihydro-2-methyl-5-(4',4'-ethylenedioxypiperidinomethyl)-indole-4-(5H)-one,
3-isopropyl-6,7-dihydro-2-methyl-5-(4',4'-ethylenedioxypiperidinomethyl)-indole-4-(5H)-one,
3-butyl-6,7-dihydro-2-methyl-5-(4',4'-ethylenedioxypiperidinomethyl)-indole-4-(5H)-one,
3-allyl-6,7-dihydro-2-methyl-5-(4',4'-ethylenedioxypiperidinomethyl)-indole-4-(5H)-one,
3-proparyl-6,7-dihydro-2-methyl-5-(4',4'-ethylenedioxypiperidinomethyl)-indole-4-(5H)-one,
3-ethinyl-6,7-dihydro-2-methyl-5-(4',4'-ethylenedioxypiperidinomethyl)-indole-4-(5H)-one,
1,3-diethyl-6,7-dihydro-2-methyl-5-(4',4'-ethylenedioxypiperidinomethyl)-indole-4-(5H)-one,
1-propyl-3-ethyl-6,7-dihydro-2-methyl-5-(4',4'-ethylenedioxypiperidinomethyl)-indole-4-(5H)-one,
1-benzyl-3-ethyl-6,7-dihydro-2-methyl-5-(4',4'-ethylenedioxypiperidinomethyl)-indole-4-(5H)-one,
1-phenyl-3-ethyl-6,7-dihydro-2-methyl-5-(4',4'-ethylenedioxypiperidinomethyl)-indole-4-(5H)-one,
1-vinyl-3-ethyl-6,7-dihydro-2-methyl-5-(4',4'-ethylenedioxypiperidinomethyl)-indole-4-(5H)-one,
1-ethinyl-3-ethyl-6,7-dihydro-2-methyl-5-(4',4'-ethylenedioxypiperidinomethyl)-indole-4-(5H)-one,
1-isopropyl-3-ethyl-6,7-dihydro-2-methyl-5-(4',4'-ethylenedioxypiperidinomethyl)-indole-4-(5H)-one,
1-butyl-3-ethyl-6,7-dihydro-2-methyl-5-(4',4'-ethyleneoxypiperidinomethyl)-indole-4-(5H)-one,
1-allyl-3-ethyl-6,7-dihydro-2-methyl-5-(4',4'-ethylenedioxypiperidinomethyl)-indole-4-(5H)-one,
1-propargyl-3-ethyl-6,7-dihydro-2-methyl-5-(4',4'-ethylenedioxypiperidinomethyl)-indole-4-(5H)-one,
1-ethinyl-3-ethyl-6,7-dihydro-2-methyl-5-(4',4'-ethylenedioxypiperidinomethyl)-indole-4-(5H)-one,
1,2,3-trimethyl-6,7-dihydro-5-(4',4'-ethylenedioxypiperidinomethyl)-indole-4-(5H)-one,
1,2,3-triphenyl-6,7-dihydro-5-(4',4'-ethylenedioxypiperidinomethyl)-indole-4-(5H)-one,
1,2,3-tribenzyl-6,7-dihydro-5-(4',4'-ethylenedioxypiperidinomethyl)-indole-4-(5H)-one, and
1,2,3-triethyl-6,7-dihydro-5-(4',4'-ethylenedioxypiperidinomethyl)-indole-4-(5H)-one, respectively.

EXAMPLE 12

Preparation of 3-ethyl-6,7-dihydro-2-methyl-5-(4',4'-ethylenedioxypiperidinomethyl)-indole-4-(5H)-one monosulfate To isopropanol (300 ml.) was added 3-ethyl-6,7-dihydro-2-methyl - 5 - (4',4'-ethylenedioxypiperidinomethyl)-indole-4-(5H)-one (30 g.). To this mixture was added with stirring 9 M. $H_2SO_4$ (13 ml.) and a solution was obtained. Crysallization commenced and the mixture was slurried for 0.5 hour. The crystals were separated by filtration, washed with 100 ml. isopropanol and vacuum dried at 50° C. for 24 hours. Yield 38.5 g. of the monosulfate salt. The infrared spectrum was consistent with the structure (sulfate salt) exhibiting bands at 1620 and 1640 cm.$^{-1}$.

*Analysis.*—Calc'd for $C_{19}H_{30}N_2O_7S$ (percent): N, 6.55; S, 7.46. Found (percent): N, 6.71; S, 7.65.

MANUFACTURING INSTRUCTIONS— LARGER BATCH (1) Cautiously, slowly and with stirring add 50 ml. of concentrated sulfuric acid to 50 ml. of cold water in an ice bath. Cool this mixture to about 22–25° C.
(2) Suspend with moderate stirring 60 g. of 60–100 mesh 3-ethyl-6,7-dihydro - 2 - methyl-5-(4',4'-ethylenedioxypiperidinomethyl)-indole-4-(5H)-one in 600 ml. of isopropanol.
(3) At ambient temperature add with moderate stirring 30 ml. of the sulfuric acid solution of No. 1 above. A solution is obtained and crystallization is rapid. The mixture is slurried at ambient temperature for 0.5 hour. The crystals are removed by filtration, washed with 300 ml. of isopropanol and then vacuum dried at 50° C.— 24 hours. Contemplated yield: 77 g.

While this invention has been described and exemplified in terms of its preferred embodiment, those skilled in the art will appreciate that modifications can be made without departing from the spirit and scope of the invention.

We claim:
1. The monosulfate salt of the compound of the formula

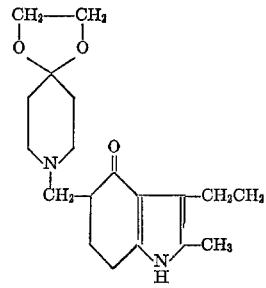

References Cited
UNITED STATES PATENTS 3,491,093    1/1970    Pachter et al.   ------ 260—247.5
3,591,594    7/1971    Hopps et al.   ------- 260—294.7

HENRY R. JILES, Primary Examiner

G. T. TODD, Assistant Examiner

U.S. Cl. X.R.

260—293.66, 326.16; 424—267

UNITED STATES PATENT OFFICE
CERTIFICATE OF CORRECTION

Patent No. 3,786,057          Dated February 23, 1971

Inventor(s)   Harvey Byron Hopps et al

It is certified that error appears in the above-identified patent and that said Letters Patent are hereby corrected as shown below:

In Column 2, line 23, change "form" to "from"
In Column 5, line 8, change "of" to "or"
In Column 7, line 22, change "dioxy)piperidinomethyl]-indole-5-(5H)-one" to "dioxy)piperidinomethyl]-indole-4-(5H)-one"

In Claim 1 change the formula to:

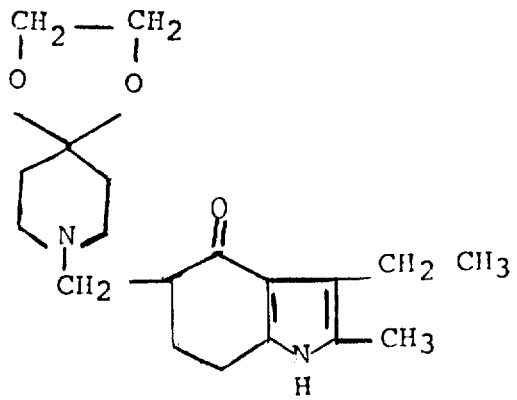

Signed and sealed this 30th day of July 1974.

(SEAL)
Attest:

McCOY M. GIBSON, JR.                C. MARSHALL DANN
Attesting Officer                   Commissioner of Patents